(12) United States Patent
Bisdikian et al.

(10) Patent No.: US 6,205,413 B1
(45) Date of Patent: Mar. 20, 2001

(54) END-USER ORIENTED PERFORMANCE MONITORING SYSTEM FOR INTERACTIVE END-TO-END DATA COMMUNICATIONS

(76) Inventors: Chatschik Bisdikian, 20 Lawrence St., Mt. Kisco, NY (US) 10549; Kiyoshi Maruyama, 7 Green La., Chappaqua, NY (US) 10514

( * ) Notice: Subject to any disclaimer, the term of this patent is extended or adjusted under 35 U.S.C. 154(b) by 0 days.

(21) Appl. No.: 09/095,635

(22) Filed: Jun. 11, 1998

(51) Int. Cl.[7] .................................................. G06F 9/455
(52) U.S. Cl. ............................ 703/24; 703/23; 709/224; 714/32; 714/47
(58) Field of Search ......................... 395/500.44, 500.45, 395/500.47, 500.42, 500.43; 709/224, 100; 714/25, 32, 33, 47; 703/24, 23, 22, 21

(56) References Cited

U.S. PATENT DOCUMENTS

| | | | |
|---|---|---|---|
| 5,627,766 | * 5/1997 | Beaven | 709/224 |
| 5,781,449 | * 7/1998 | Rosborough | 709/224 |
| 5,790,425 | * 8/1998 | Wagle | 709/224 |
| 5,812,780 | * 9/1998 | Chen et al. | 709/224 |
| 5,881,268 | * 3/1999 | McDonald et al. | 395/500.42 |
| 5,958,003 | * 9/1999 | Preining et al. | 709/100 |
| 5,974,237 | * 10/1999 | Shurmer et al. | 709/224 |
| 5,974,572 | * 10/1999 | Weinber et al. | 714/33 |
| 5,996,090 | * 11/1999 | Hellertein | 714/25 |

OTHER PUBLICATIONS

Du et al., "Performance Analysis of Interconnected LANs with Server/Client Configuration", 'Communications on the Move' Sing. ICCS/ISITA '92, vol. 1, pp. 67–71, Nov. 1992.*

Cook et al., "Analytical Response Time Model for Distributed Systems", Proc. Inter. Conf. on APL. pp. 81–101, Aug. 1990.*

Mainkar, V., "Availability of Transaction Processing Systems Based on User–perceived Performance", Proc. Sixteeth Symp. on Reliable Distributed Systems, pp. 10–17, Oct. 1997.*

Dimpsey et al., "A Measurement–based Model to Predict the Performance Impact of System Modifications: A Case Study", IEEE Trans. on Parallel and Distributed Systems, vol. 6, Issue 1, pp. 28–40, Jan. 1995.*

* cited by examiner

*Primary Examiner*—Kevin J. Teska
*Assistant Examiner*—Douglas W. Sergent

(57) ABSTRACT

Performance monitoring of network connections is an integral and necessary part of network operation, administration and management. The performance monitoring reflects the "goodness" of the communication system in supporting "high-level" data communication services to end-users. This is done by quantifying the perception of an end-user and using this quantification as a guideline for the capability of the network to provide communication services. The computer implemented process is a user-friendly, automated collection and tabulation of performance measurements that directly reflects the perception of an end-user on the capabilities of the underlying communications network. The disclosure is geared toward the "Web-centric" Internet world, but the method can be adapted to non-Internet communication systems.

5 Claims, 6 Drawing Sheets

AcNn: ACCESS NETWORK n
GWn: GATEWAY n

END-USER ORIENTED PERFORMANCE MONITORING SYSTEM FOR INTERACTIVE END-TO-END DATA COMMUNICATIONS

BACKGROUND OF THE INVENTION

1. Field of the Invention

The present invention generally relates to interactive computer communications and, more particularly, to a method for a user-friendly, automated collection and tabulation of performance measurements that directly reflects the perception of an end-user on the capabilities of the underlying communications network.

2. Background Description

Interest in interactive data services has been growing by leaps and bounds for over two decades now, and there is no hint of a slowing down of this growth. From simple file transfers, to World-Wide Web (WWW) or, simply, Web-based interactions and transactions, telecommuting and remote learning, to customer initiated and controlled digital video transmissions, etc., interactive data services become more and more a part of our every day experiences, both at the office and at home.

The success of interactive data services deployment depends on many factors, like the availability of cost effective communications technology, the quality of communication equipment used, the quality of the communications media and communications protocols adopted, etc. Prior to deploying a new service, network operators go through a certification process to certify that their networks can support the intended services. Also, during regular operation of the network, and while services are being deployed over them, network operators continue to monitor the quality of their networks and are continuously in search of possible network breakdowns, like amplifier degradation, noise interference, communication link severance, etc., that need to be fixed as soon as possible.

Although the ultimate objective of network certification and monitoring is to make sure that users, or subscribers, of the network supported services will be satisfied by the services provided, network certification and monitoring restricts itself to "low-level" measurements like signal-to-noise (S/N) ratio, bit error rate (BER), percentage of lost packets (PLP), etc. Yet, as useful as this information is, it is network oriented and it does not always accurately reflect the capability of the communication system to support specific data services to subscribers. More importantly, such a certification and monitoring of the network does not reveal at all the level of satisfaction of a subscriber to an interactive data service. Subscribers do not measure satisfaction with BERs, S/Ns, etc., quantities that most probably are foreign to them. Subscribers measure satisfaction by the responsiveness of the system, e.g., how fast a file is transferred to a subscriber's computer, or how fast does a Web-page, from a simple text-based page, to an elaborate graphics-oriented page, is downloaded to the subscriber's Web-browser.

Clearly, any reputable service provider and network operator cannot afford to rely on feedback received directly from subscribers. Such feedback will, most probably, be too late received and quite likely will reflect a very dissatisfied group of subscribers. A pro-active means of network performance monitoring is needed that will provide the network operators and service providers with up-to-the-minute subscriber satisfaction measurements and will allow them sufficient time to take corrective actions whenever signs of problems arise.

SUMMARY OF THE INVENTION

It is therefore an object of the present invention to provide a network monitoring and testing system that will reflect a subscriber's perception of the quality of provided services.

The system of this invention collects performance data from a series of interactions (or, tests) between a subscriber computer system and a service provider and will perform statistical analysis and report the test results of these tests to appropriate network and service providers personnel.

It is another object of this invention to automate the process of the data collection, processing and displaying, while dynamically adjust the performed tests so that data can be collected for various types of subscriber interactions and during various times of the day.

According to the invention, all the necessary automations are achieved by introducing a virtual subscriber system, which is a piece of computer software running on designated computer hardware systems, e.g., personal computers, or specially designed hardware, that emulates the actions of regular subscribers and is able to keep response time records between request for specific services and the receipt of these services.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

The present invention can be applied in a large number of communications environments; however, in our preferred embodiment, we will use the Internet network, which consists of a collection of interconnected computer networks running the TCP/IP (transport control protocol/Internet protocol) suite of protocols that enable the communication between practically any computer on the globe. Note that the Internet is not a necessity for the practice of our invention. The teachings of the invention can be applied over any system of networked computers as long as they run an appropriately written computer software. For our preferred embodiment, we also consider the use of Web-browsers and Web-servers as a means for interfacing and configuring the virtual subscriber systems. It will be apparent from the description which follows that this is not the only way that one can interface to the system.

Figure 1:
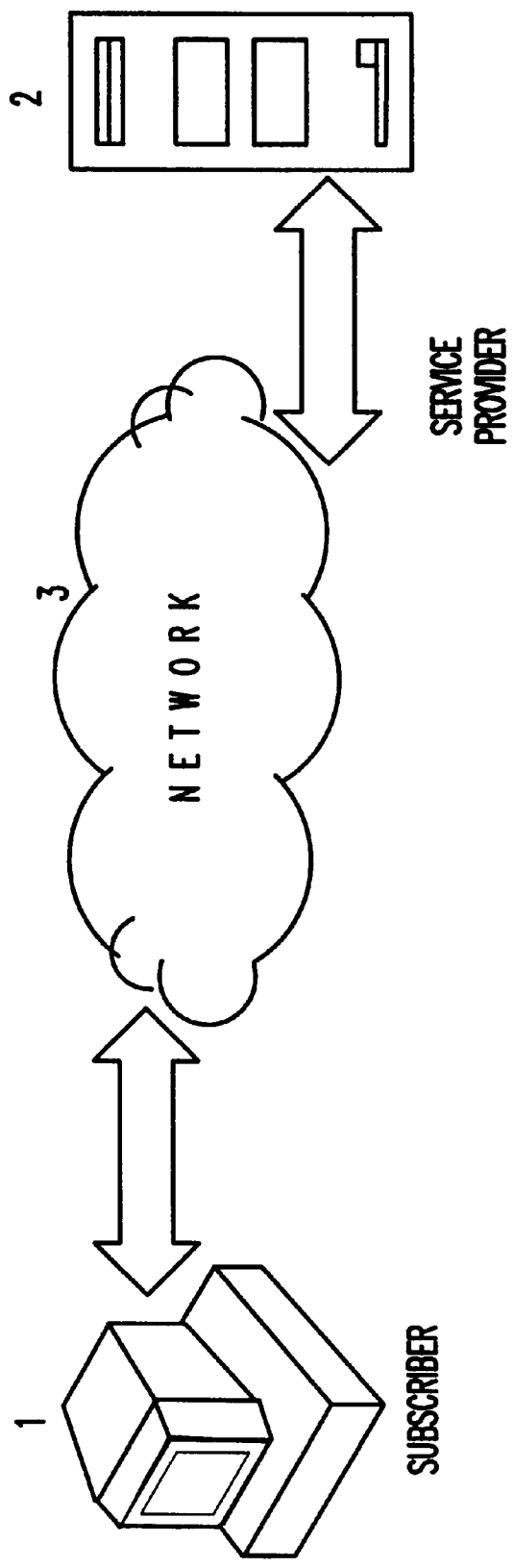
FIG. 1 is a block diagram of a networked data service system.
Figure 2:
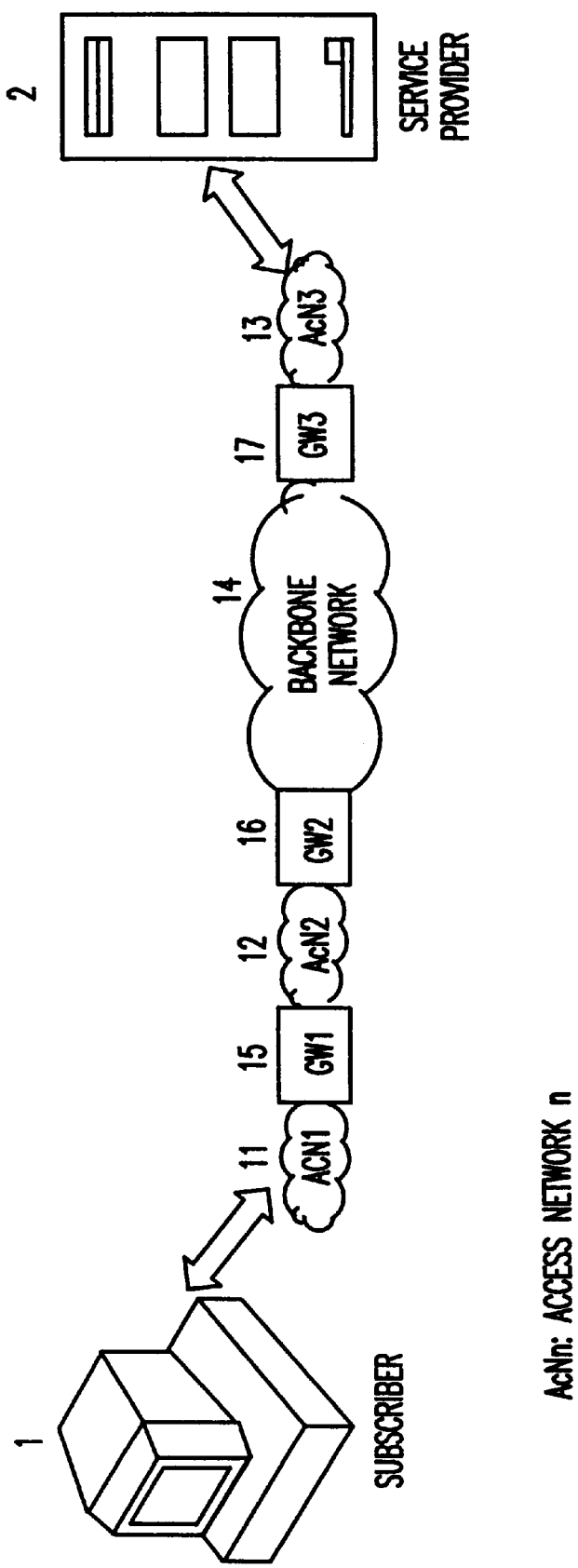
FIG. 2 is a block diagram similar to FIG. 1 showing the network components of the system.

Referring now to the drawings, and more particularly to FIG. 1, there is shown a subscriber 1 of interactive data services accessing and receiving services from a service provider 2 via a communication network 3. The network 3 could be a network directly connecting the two end-entities (the service provider and the subscriber), e.g., using a leased telephone line. More commonly though, the communications network 3 will consists of a concatenation of "regional networks" as shown in FIG. 2. Specifically, the subscriber may be connected to a series of subscriber access networks 11, 12, e.g., an office local area network (LAN), a cable television (CATV) data network, etc. The subscriber access network may then connect to a long-hall, high-speed backbone data network 14, e.g., an Internet backbone. Finally, connection to the service provider 2 may be via the service provider access network(s) 13.

Since, the communications media and the data transport protocols at each of the regional networks between the subscriber and the service provider in FIG. 2 may be different, the various networks are attached to each other via appropriate communications gateways 15, 16, 17 that perform all the necessary data formatting and protocol conversions. The regional networks are not restricted in any way and they can be circuit or packet switched, shared media or dedicated media, point-to-point, or point-to-multipoint, etc.

The detailed topology and organization of the communications networks are of no concern to a data service subscriber, who only cares of receiving the requested service in a timely and reliable fashion. The simplified networked system of FIG. 1 is at best the understanding of a subscriber of the system architecture. More frequently than not, a subscriber may think that he/she is actually connected to the service directly.

With the above understanding of a subscriber's network topology, in our preferred embodiment of the virtual subscriber system, we attach to the network a subscriber emulator which can be implemented as a computer program running on, say, a personal computer, not unlike the client computer system used by a real subscriber. The computer program periodically requests service from a designated service provider, or even a multitude of service providers, which responds as if the request came from a real subscriber and thus, for example, starts a preselected movie, downloads a designated Web-page, or transfers a particular data file. We refer to such a system as a virtual subscriber.

The virtual subscriber records the time, referred to as the response time, elapsed from the moment it requests the service until the requested services commences, as in the case of selecting a movie, or the requested services is completed, as in the case of requesting a particular Web-page. It also records other performance measurements that are related with the quality of the service tested. For example, it could measure the achieved data transfer rates, portion of traffic that is delayed beyond an acceptable time threshold, a measurement that is very important for real-time traffic with strictly bounded delay requirements, etc. The virtual subscriber then reports the collected response times and other performance measurements to appropriate personnel from either the service or network provider organizations.

For maximum flexibility in the test performed, the frequency of requests for services generated by the virtual subscriber, as well as the nature of the requested services is configurable and can change under the control of a technician supervising the testing process. We will further discuss the latter shortly. The virtual subscriber can be deployed in several locations on a network, either coexisting on the same computer system that a regular subscriber uses, or more preferably on specially designated computers strategically placed on the network by the network operators and/or service providers.

The placement of the virtual subscriber systems can be done either prior to or after the deployment of a new data service to regular subscribers.

In the former case, the objective is to test whether the network can be certified as being capable of supporting a particular service. As an example, while a CATV operator upgrades its network to make it capable of supporting data services, it may deploy virtual subscribers on the network to emulate the actual traffic of real subscriber prior to actually deploying the service. In doing so, the cable operator can gain valuable information on the capabilities of their installations and troubleshoot and fine-tune their networks prior to offering the service to their customers.

In the latter case, where the virtual subscriber system operates after the deployment of a service, the objective is to provide necessary information on the quality of the provided services as experienced by the real subscribers and, in case of quality of service degradation, react in time prior (hopefully) to receiving complaints from the real subscribers. Also, in the case of an ever increasing penetration of particular data services, the network operators and service providers can use virtual subscribers to determine whether their current system can support the addition of new subscribers or the network has to be upgraded prior to the addition of the new subscribers.

While the main objective of the virtual subscriber system is to make end-user performance measurements, the system will be of limited use if the characteristics of the performed measurements cannot be altered to better reflect subscriber demand, and/or generate special traffic scenarios on the network that may reveal the capabilities and limitations of the system. For this reason, the virtual subscriber system is accessible to a technician via a special user interface computer program available on a technician's console. Using this interface, a technician can configure the service request patterns of the virtual subscriber and adjust its service request profile and time intervals over which requests are generated.

Figure 3:
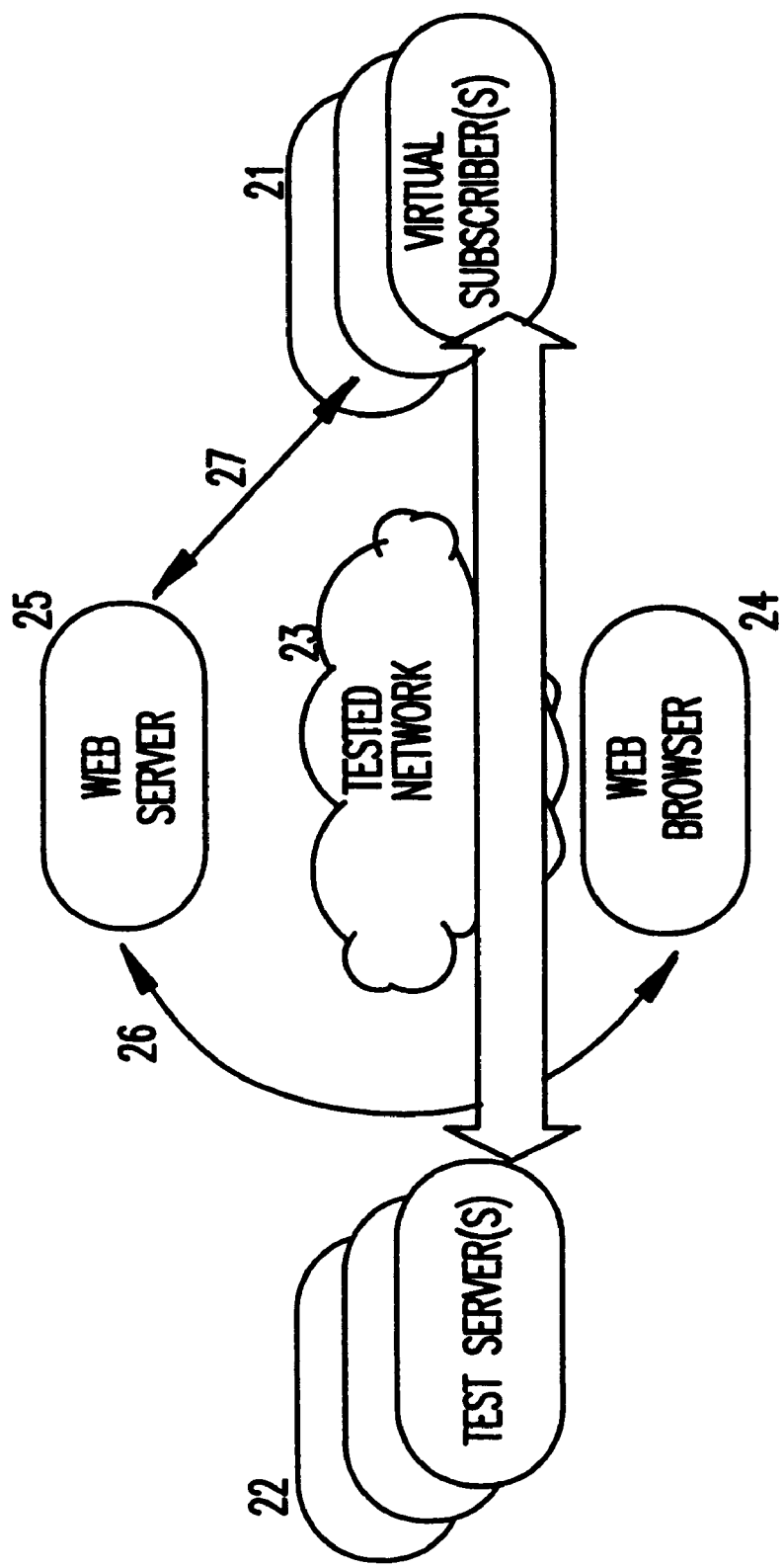
FIG. 3 is a block diagram showing the virtual subscriber components which implement the present invention.

Although specialized user interfaces can be built, for our preferred embodiment we have chosen the ubiquitous Web-browser to communicate the technician's configuration choices to the virtual subscriber via a Web-server. FIG. 3 shows a fully functional deployment of the virtual subscriber system in this case. The system consists of four computer processes that may or may not run on the same computer system. For maximum flexibility, we have implemented the system running on four different computers. This allows us to monitor and supervise the tests while located remotely with respect to either the physical location of the virtual subscriber(s) or the service provider(s).

Referring to FIG. 3, we consider a technician administering the test to access the system via a Web-browser 24 which connects to the test configuration Web-page residing on the Web-server 25. Filling up appropriate forms via the Web-browser, which we will discuss this later, the technician communicates his choices for a particular series of tests to the Web-server 25. The technician can then request the Web-server 25 to pass this information to any one of the virtual subscriber(s) 21 that he/she has selected. Following this, the virtual subscriber(s) can start interacting with any one of a specified service providers 22 over the tested network 23. The communication link 26 between the Web-browser 24 and Web-server 25, and the communication link 27 between the Web-server 25 and virtual subscriber 21 may or may not be over the network 23 that is to be tested. In our implementation, all communications occur over the Internet and quite likely the tested network shares resources with links 26, 27. Note that due to the nature of the Internet, one can practically never assure that traffic follows a distinct series of links not shared by other traffic streams.

Since test servers may be located anywhere over the tested system, they may be also placed in such a way that permit testing portions of the network between a subscriber and the service provider. For example, referring to FIG. 2, test servers may be placed, among other places, in proximity to the gateways 15, 16 and 17 so that the testing and monitoring process performed by the virtual subscriber system is able to identify which portions of the end-to-end system cause a problem rather than just identify that there exists a problem. This localization of the problem source could substantially decrease the time it takes to correct a problem.

Figure 4:
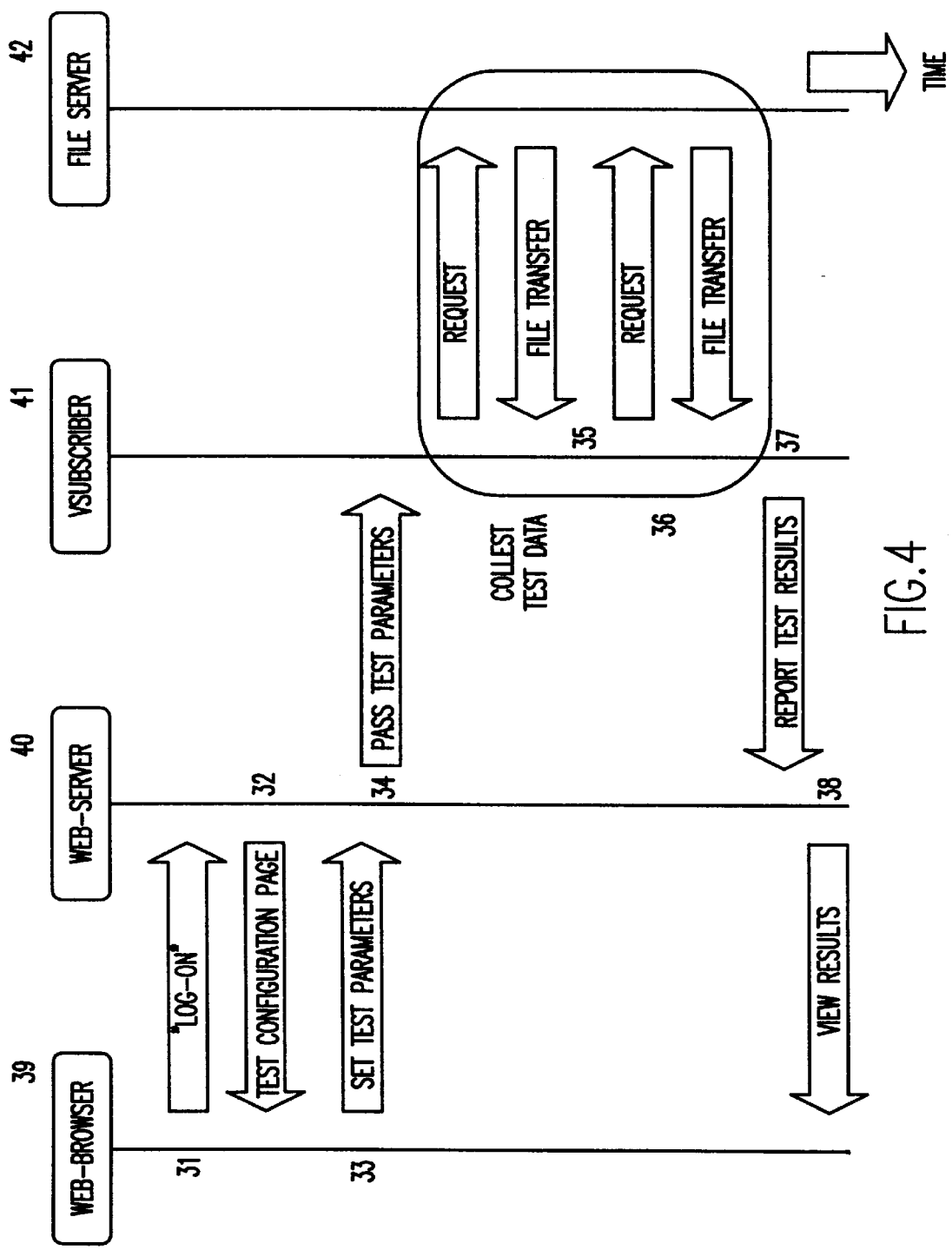
FIG. 4 is a protocol diagram illustrating the virtual subscriber communication protocol.

FIG. 4 summarizes the series of interactions between the four computer processes in administering and executing a test that constitutes the protocol according to the preferred embodiment of the invention. For ease of presentation, in FIG. 4 we assume that only one virtual subscriber will execute a test and that only one service offering, that of file transfers, will be tested. This scenario can easily be generalized to the multiple virtual subscribers and services case.

First, via a Web-browser 39, a technician logs-on 31 the test configuration page 32 residing on the Web-server 40. The only reason that we have a log-on procedure via, say, a user identification (ID) and password entry, is to restrict access to the testing facility only to authorized personnel. The technician then enters 33 the test parameters on the test configuration page. The Web-server 40 then processes the test page and identifies the candidate virtual subscriber, VSubscriber 41 in FIG. 4, and passes 34 the test configuration parameters to the virtual subscriber 41. The virtual subscriber 41 in turn processes the test parameters and it identifies the server, the file server 42 in FIG. 4, against which it will perform the performance tests and also learn about the time intervals over which it will perform the test. As an alternative, time information may be provided by the Web-server 40 by a sequence of start ad stop commands that are sent by the Web-server 40 to the virtual subscriber 41 at appropriate times.

The virtual subscriber 41 is now ready to execute the performance test, which in this case consists of a sequence 35 of "send me a file" requests to the file server 42 and the subsequent satisfaction of these requests by the server. During the test, the virtual subscriber collects 36 appropriate performance data, e.g., response time to satisfy each file transfer request, transmission rates achieved, etc. At the completion of the test, or even during the test, the virtual subscriber 41 reports 37 back to the Web-server 40 the test results. The Web-server 40 then performs any required statistical analysis on these data and then formats them in a way appropriate for viewing 38 back on the technician's Web-browser 39. For logging purposes, the Web-server 41 may also store the test results at a database.

As an alternative, the virtual subscriber 41 may report the test results to the database first, and then have the Web-server 40 retrieve them from the database. Albeit useful, the functionality of the storage database is not a required one in our preferred embodiment.

Note that retrieving, viewing and processing the test data does not really require the presence of a technician. Processing of the test data could be an automated process. If these data reveal unacceptable service performance, according to some prespecified criteria, an automated alert may be triggered to notify repair personnel of a potential problem that needs to be investigated and corrected.

Figure 5:
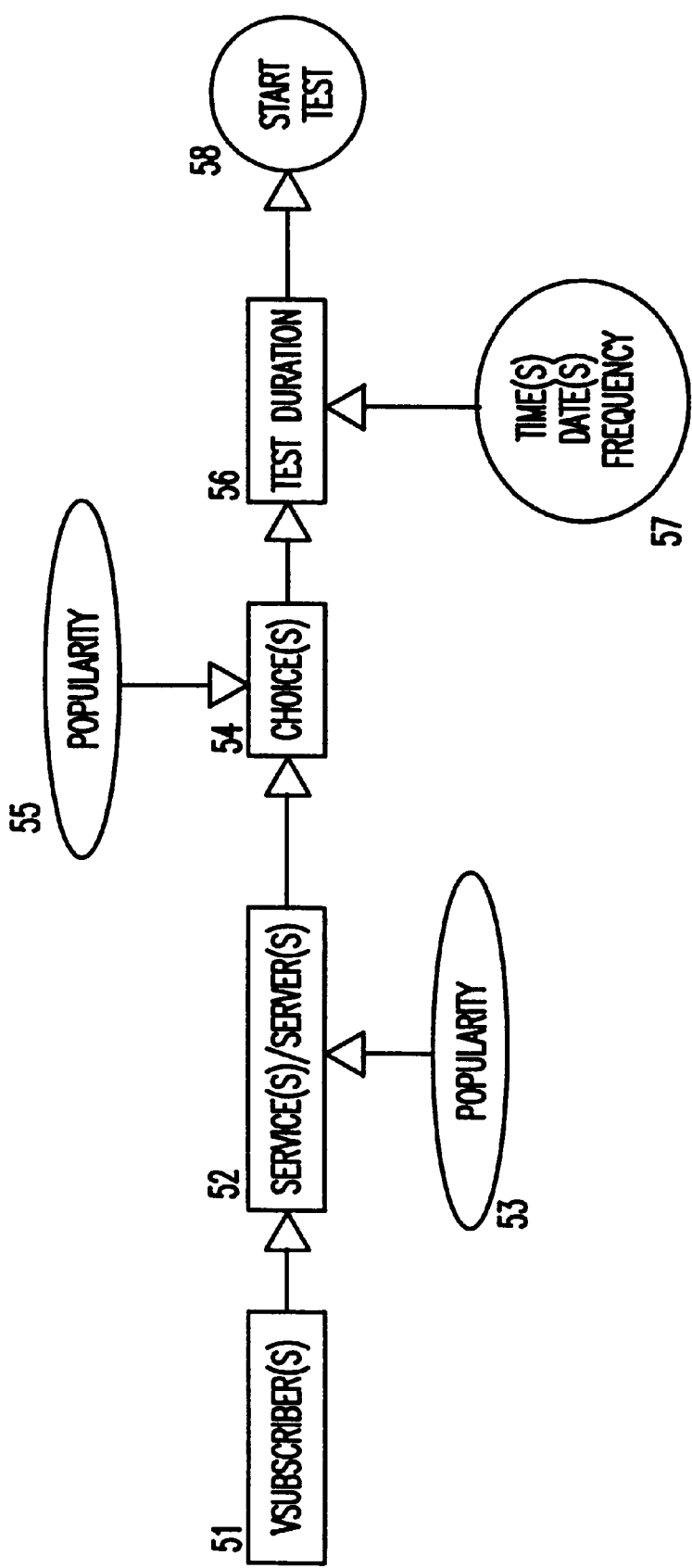
FIG. 5 is a flow diagram showing the test configuration page element of the virtual subscriber.

The technician is given sufficient flexibility in influencing the performance tests. FIG. 5 shows some of the elements of the test that can be configured. These elements are presented to the technician in the test configuration page(s). The first element is the virtual subscriber(s) 51 that will execute the performance tests. The second element is the tested services and the associated test servers 52 that will participate in this test. These servers can also be qualified by a popularity ranking 53, thus allowing, during the test period, to access several test servers with different probabilities each one. Having selected a service and a test server, we may further qualify particular choices for testing 54, e.g., for a file server we can specify what files to transfer and further qualify them with a popularity ranking 55, thus allowing some particular files to be requested more often than others, and thus allowing configurable traffic load profiles over the tested network. At this stage, we may also specify what performance measurements are to be taken. A final element of the configuration page relates to the test duration 56 which can be qualified by start and end times and dates, and frequency of request for service generation. Having filled all the necessary test configuration entries, the technician can then start the test 58.

Figure 6:
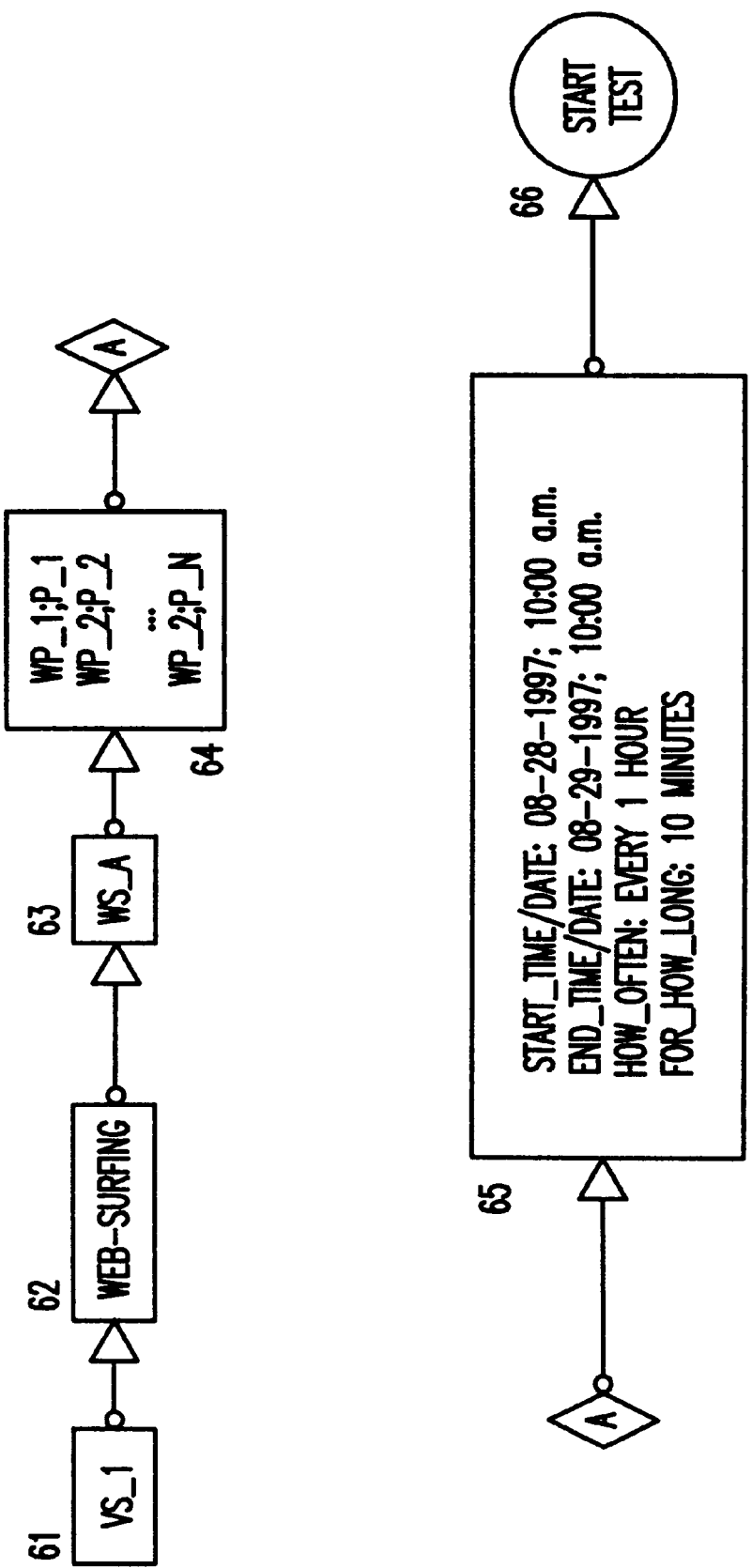
FIG. 6 is a flow diagram showing an example of a configuration page.

An example of test configuration choices based on the elements of FIG. 5 are shown in FIG. 6. For this example, only the virtual subscriber VS_1 61 will be configured during the current test configuration phase. The service of choice will be "Web-surfing" 62 and the server to be used will be the Web-server WS_A 63. During the test, the Web-pages WP_1 through WP_n will be requested and retrieved with probabilities p_1 through p_n, respectively, 64. The performance measurement taken is the default, i.e., the response time elapsed from the moment that a request is placed for a Web-page by the virtual subscriber, until the web-page is received in its entirety. Finally, the test is to commence on Aug. 28, 1997 at 10:00 am and it will terminate 24 hours later. During this twenty-four hour period, Web-page request and retrieval phases will start every one hour and each such period will last 10 minutes 65. Such time granularity is needed in order to collect data on any day and at any time without imposing a severe and continuous loading burden of the tested network. Having entered all this information, the technician can press the start test 66 button on the test configuration page.

While the invention has been described in terms of a single preferred embodiment, those skilled in the art will recognize that the invention can be practiced with modification within the spirit and scope of the appended claims.

Having thus described our invention, what we claim as new and desire to secure by Letters Patent is as follows:

1. In a computer communications system where subscribers receive interactive data services on client computer systems from server computer systems, both the client and server computer systems being attached to the communications system, a computer process executed by a client computer system that acts as a virtual subscriber to the data services supported by the said communications system comprising the steps of:
   emulating by the virtual subscriber the interactive behavior of regular said subscribers to said data services; and
   collecting information related to the performance of communication links between said client and server systems, said collected information being responsive to said emulating step and being registered by the virtual subscriber.

2. The computer process recited in claim 1 wherein said communication system has multiple client computer systems executing copies of said virtual subscriber process.

3. The computer process recited in claim 2 wherein each said virtual subscriber process being capable of requesting data services from any number of respecified data servers and collecting information related to the performance of said communication links between said client and server systems, said collected information being related to each said request for service.

4. The computer process recited in claim 3 further comprising the step of controlling each said virtual subscriber process and altering its said interactive behavior via another computer process executing either on the same client computer system executing the said virtual subscriber process or located remotely from the client computer system executing said virtual subscriber process.

5. The computer process recited in 4 wherein said information related to the performance of said communication links between said client and server systems collected by each said virtual subscriber process is accessible and viewable via another computer process executing either on the same client computer system executing the said virtual subscriber process or located remotely from the client computer system executing the said virtual subscriber process.

* * * * *